(12) United States Patent
Miranda Anon et al.

(10) Patent No.: US 12,441,360 B2
(45) Date of Patent: *Oct. 14, 2025

(54) MULTI-PROFILE QUADRATIC PROGRAMMING (MPQP) FOR OPTIMAL GAP SELECTION AND SPEED PLANNING OF AUTONOMOUS DRIVING

(71) Applicant: Honda Motor Co., Ltd., Tokyo (JP)

(72) Inventors: Alexandre Miranda Anon, Premia de Dalt (ES); Sangjae Bae, San Jose, CA (US); David Isele, Sunnyvale, CA (US); Manish Saroya, Santa Clara, CA (US); Kikuo Fujimura, Palo Alto, CA (US)

(73) Assignee: Honda Motor Co., Ltd., Tokyo (JP)

( * ) Notice: Subject to any disclaimer, the term of this patent is extended or adjusted under 35 U.S.C. 154(b) by 200 days.

This patent is subject to a terminal disclaimer.

(21) Appl. No.: 18/384,616

(22) Filed: Oct. 27, 2023

(65) Prior Publication Data

US 2025/0108827 A1     Apr. 3, 2025

Related U.S. Application Data

(60) Provisional application No. 63/541,022, filed on Sep. 28, 2023.

(51) Int. Cl.
    *B60W 60/00*    (2020.01)
    *B60W 30/14*    (2006.01)
    *B60W 50/00*    (2006.01)

(52) U.S. Cl.
    CPC .......... *B60W 60/001* (2020.02); *B60W 30/14* (2013.01); *B60W 30/143* (2013.01);
    (Continued)

(58) Field of Classification Search
    CPC .. B60W 60/001; B60W 30/14; B60W 30/143; B60W 50/00; B60W 60/0011;
    (Continued)

(56) References Cited

U.S. PATENT DOCUMENTS

2019/0250617 A1* 8/2019 Ford et al. ............. B60W 30/09
2021/0053561 A1* 2/2021 Beller et al. ......... G08G 1/0962
(Continued)

FOREIGN PATENT DOCUMENTS

| CN | 110597245 | * 8/2019 | ............... G05D 1/02 |
| CN | 112669606 | * 12/2020 | ............... G08G 1/01 |

OTHER PUBLICATIONS

Lester E Dubins. On curves of minimal length with a constraint on average curvature, and with prescribed initial and terminal positions and tangents. American Journal of mathematics, 79(3):497-516, 1957.

(Continued)

*Primary Examiner* — Brodie J Follman
(74) *Attorney, Agent, or Firm* — Weiss & Moy, PC; Jeffrey D. Moy

(57) ABSTRACT

A method for generating operable driving areas for an autonomous driving vehicle based on a path trajectory of the autonomous driving vehicle is provided. The method may form a space time (ST) graph indicating a distance of travel along the path trajectory with respect to time of the autonomous driving vehicle and path trajectories of devices intersecting with the path trajectory of the autonomous driving vehicle. The method may segment the ST graph into cells, wherein viable cells represent discretized viable unoccupied spaces in the ST graph. The method may find passage ways for the autonomous driving vehicle based on the viable cells. The method may select a desired passage way using quadratic programming (QP) optimization when multiple passage ways are found.

19 Claims, 10 Drawing Sheets

(52) U.S. Cl.
CPC ........ *B60W 50/00* (2013.01); *B60W 60/0011* (2020.02); *B60W 60/0016* (2020.02); *B60W 60/00272* (2020.02); *B60W 60/00276* (2020.02); *B60W 2050/0003* (2013.01); *B60W 2510/104* (2013.01); *B60W 2554/4044* (2020.02); *B60W 2554/80* (2020.02); *B60W 2556/10* (2020.02)

(58) Field of Classification Search
CPC ....... B60W 60/0016; B60W 60/00272; B60W 60/00276; B60W 2050/0003; B60W 2510/104; B60W 2554/4044; B60W 2554/80; B60W 2556/10; B60W 2050/0006; B60W 2554/00; B60W 60/0027

See application file for complete search history.

(56) References Cited

U.S. PATENT DOCUMENTS

| | | | | |
|---|---|---|---|---|
| 2022/0227367 | A1* | 7/2022 | Kario et al. | B60W 30/0956 |
| 2024/0132112 | A1* | 4/2024 | Afshar et al. | B60W 60/00272 |

OTHER PUBLICATIONS

James Reeds and Lawrence Shepp. Optimal paths for a car that goes both forwards and backwards. Pacific journal of mathematics, 145(2):367-393, 1990.

Alexander Heilmeier, Alexander Wischnewski, Leonhard Hermansdorfer, Johannes Betz, Markus Lienkamp, and Boris Lohmann. Minimum curvature trajectory planning and control for an autonomous race car. Vehicle System Dynamics, 2019.

Maxime Bouton, Alireza Nakhaei, David Isele, Kikuo Fujimura, and Mykel J Kochenderfer. Reinforcement learning with iterative reasoning for merging in dense traffic. In 2020 IEEE 23rd International Conference on Intelligent Transportation Systems (ITSC), pp. 1-6. IEEE, 2020.

Sangjae Bae, David Isele, Alireza Nakhaei, Peng Xu, Alexandre Miranda Anon, Chiho Choi, Kikuo Fujimura, and Scott Moura. Lane- change in dense traffic with model predictive control and neural networks. IEEE Transactions on Control Systems Technology, 2022.

Boris Ivanovic, Amine Elhafsi, Guy Rosman, Adrien Gaidon, and Marco Pavone. Mats: An interpretable trajectory forecasting representation for planning and control. arXiv preprint arXiv:2009.07517, 2020.

Faizan M Tariq, David Isele, John S. Baras, and Sangjae Bae. RCMS: Risk-aware crash mitigation system for autonomous vehicles. IEEE Intelligent Vehicles Symposium, 2023.

Thierry Fraichard and Christian Laugier. Path-velocity decomposition revisited and applied to dynamic trajectory planning. In [1993] Proceedings IEEE International Conference on Robotics and Automation, pp. 40-45. IEEE, 1993.

Piyush Gupta, David Isele, Donggun Lee, and Sangjae Bae. Interaction-aware trajectory planning for autonomous vehicles with analytic integration of neural networks into model predictive control. 2023 International Conference on Robotics and Automation (ICRA), 2023.

Anahita Mohseni-Kabir, David Isele, and Kikuo Fujimura. Interactionaware multi-agent reinforcement learning for mobile agents with individual goals. In 2019 International Conference on Robotics and Automation (ICRA), pp. 3370-3376. IEEE, 2019.

Kamal Kant and Steven W Zucker. Toward efficient trajectory planning: The path-velocity decomposition. The international journal of robotics research, 5(3):72-89, 1986.

Quang-Cuong Pham, Stephane Caron, Puttichai Lertkultanon, and ' Yoshihiko Nakamura. Planning truly dynamic motions: Path-velocity decomposition revisited. arXiv preprint arXiv:1411.4045, 2014.

Changliu Liu, Wei Zhan, and Masayoshi Tomizuka. Speed profile planning in dynamic environments via temporal optimization. In 2017 IEEE Intelligent Vehicles Symposium (IV), pp. 154-159, 2017.

Zeyu Yang, Jin Huang, Hui Yin, Diange Yang, and Zhihua Zhong. Path tracking control for underactuated vehicles with matched-mismatched uncertainties: An uncertainty decomposition based constraint-following approach. IEEE Transactions on Intelligent Transportation Systems, 23(8):12894-12907, 2021.

Vasundhara Jain, Uli Kolbe, Gabi Breuel, and Christoph Stiller. Collision avoidance for multiple static obstacles using path-velocity decomposition. IFAC-PapersOnLine, 52(8):265-270, 2019.

Wenda Xu. Motion Planning for Autonomous Vehicles in Urban Scenarios: A Sequential Optimization Approach. PhD thesis, Carnegie Mellon University, Feb. 2022.

Till-Julius Kruger, Daniel G ohring, and Fritz Ulbrich. Graph-Based Speed Planning for Autonomous Driving. PhD thesis, Free University of Berlin Berlin, Germany, 2019.

Christoforos Mavrogiannis, Jonathan A DeCastro, and Siddhartha S Srinivasa. Implicit multiagent coordination at unsignalized intersections via multimodal inference enabled by topological braids. arXiv preprint arXiv:2004.05205, 2020.

Francesco Micheli, Mattia Bersani, Stefano Arrigoni, Francesco Braghin, and Federico Cheli. Nmpc trajectory planner for urban autonomous driving. Vehicle system dynamics, 61(5):1387-1409, 2023.

Stephen P Boyd and Lieven Vandenberghe. Convex optimization. Cambridge university press, 2004.

Chao Sun, Jacopo Guanetti, Francesco Borrelli, and Scott J Moura. Optimal eco-driving control of connected and autonomous vehicles through signalized intersections. IEEE Internet of Things Journal, 7(5):3759-3773, 2020.

Xiaowei Shi and Xiaopeng Li. Trajectory planning for an autonomous vehicle with conflicting moving objects along a fixed path-an exact solution method. Transportation Research Part B: Methodological, 173:228-246, 2023.

Moritz Werling, Julius Ziegler, Soren Kammel, and Sebastian Thrun. Optimal trajectory generation for dynamic street scenarios in a frenet frame. In 2010 IEEE international conference on robotics and automation, pp. 987-993. IEEE, 2010.

Alan Bundy and Lincoln Wallen. Breadth-first search. Catalogue of artificial intelligence tools, pp. 13-13, 1984.

Alexey Dosovitskiy, German Ros, Felipe Codevilla, Antonio Lopez, and Vladlen Koltun. CARLA: An open urban driving simulator. In Proceedings of the 1st Annual Conference on Robot Learning, pp. 1-16, 2017.

Arne Kesting, Martin Treiber, and Dirk Helbing. Enhanced intelligent driver model to access the impact of driving strategies on traffic capacity. Philosophical Transactions of the Royal Society A: Mathematical, Physical and Engineering Sciences, 368(1928):4585-4605, 2010.

Clipper2—Polygon Clipping and Offsetting Library—angusj.com. http://www.angusj.com/clipper2/Docs/Overview.htm. [Accessed Jun. 27, 2023].

Hans Joachim Ferreau, Christian Kirches, Andreas Potschka, Hans Georg Bock, and Moritz Diehl. qpoases: A parametric activeset algorithm for quadratic programming. Mathematical Programming Computation, 6:327-363, 2014.

* cited by examiner

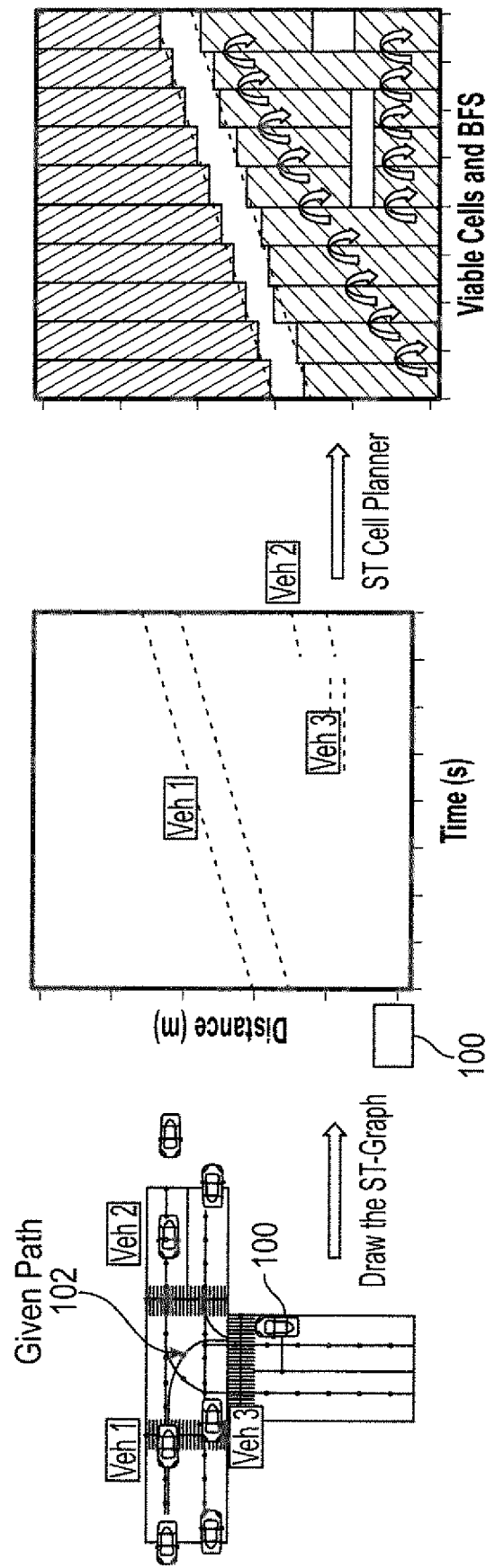

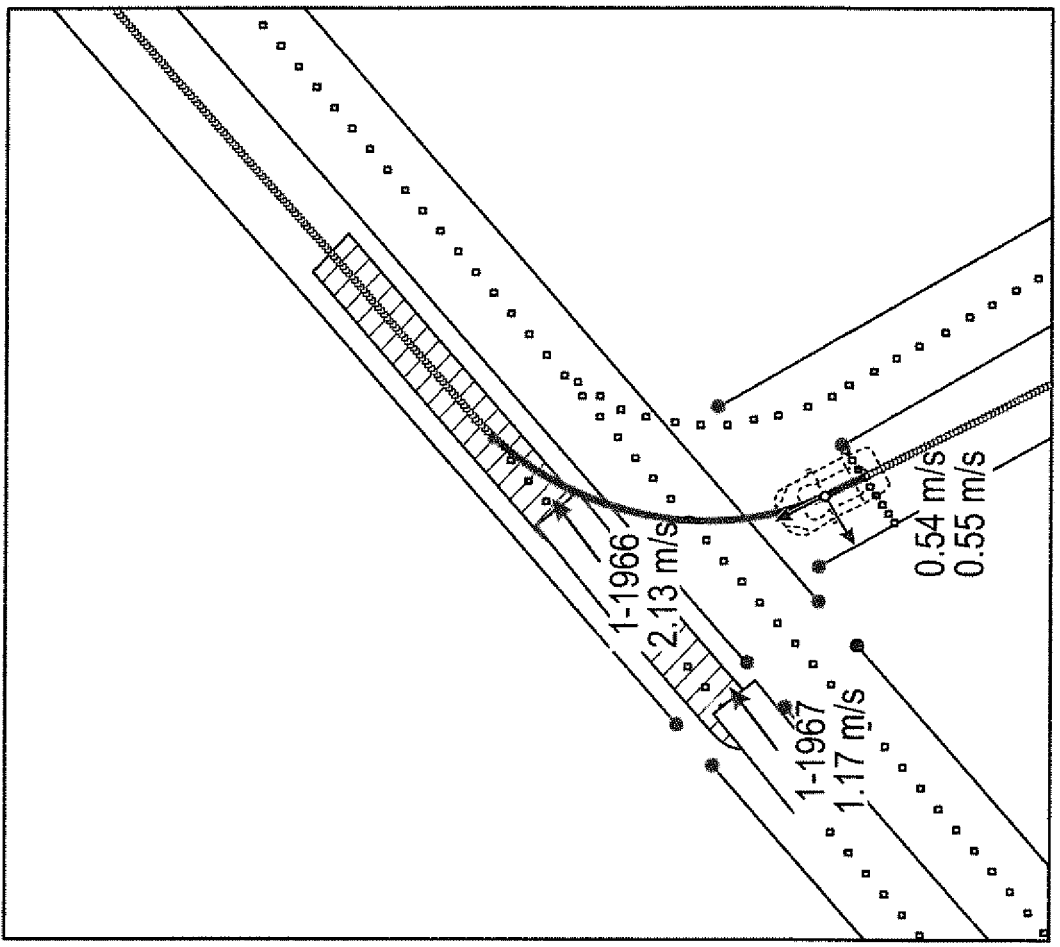
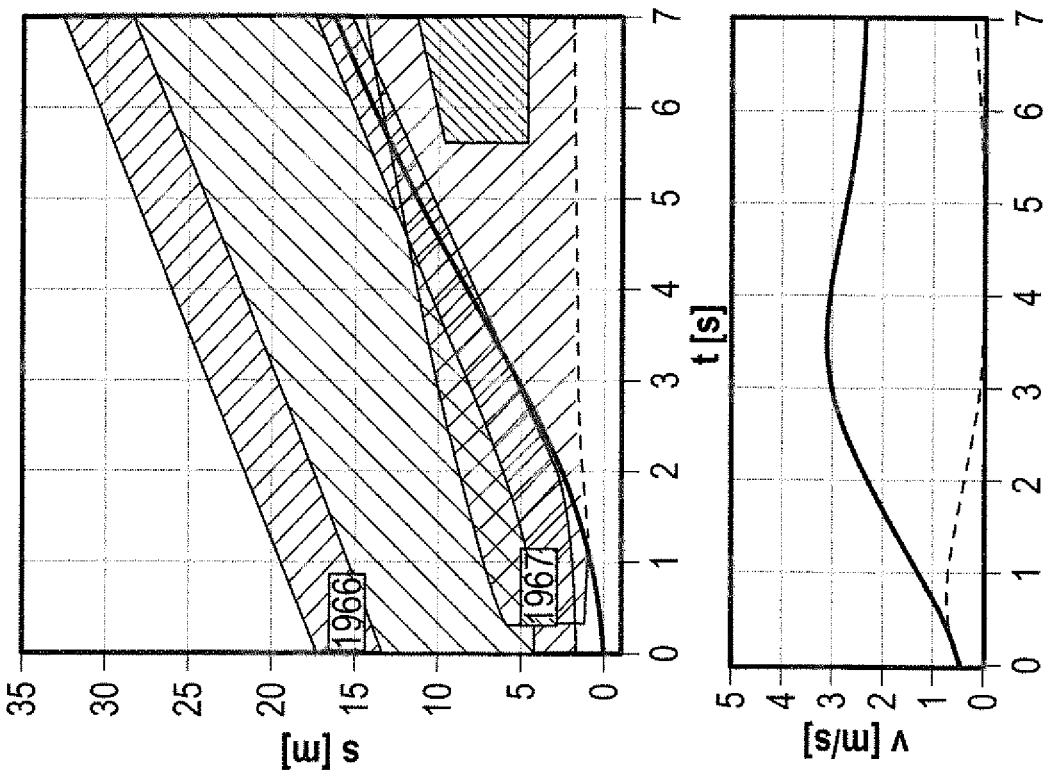
FIG. 3B
FIG. 3A

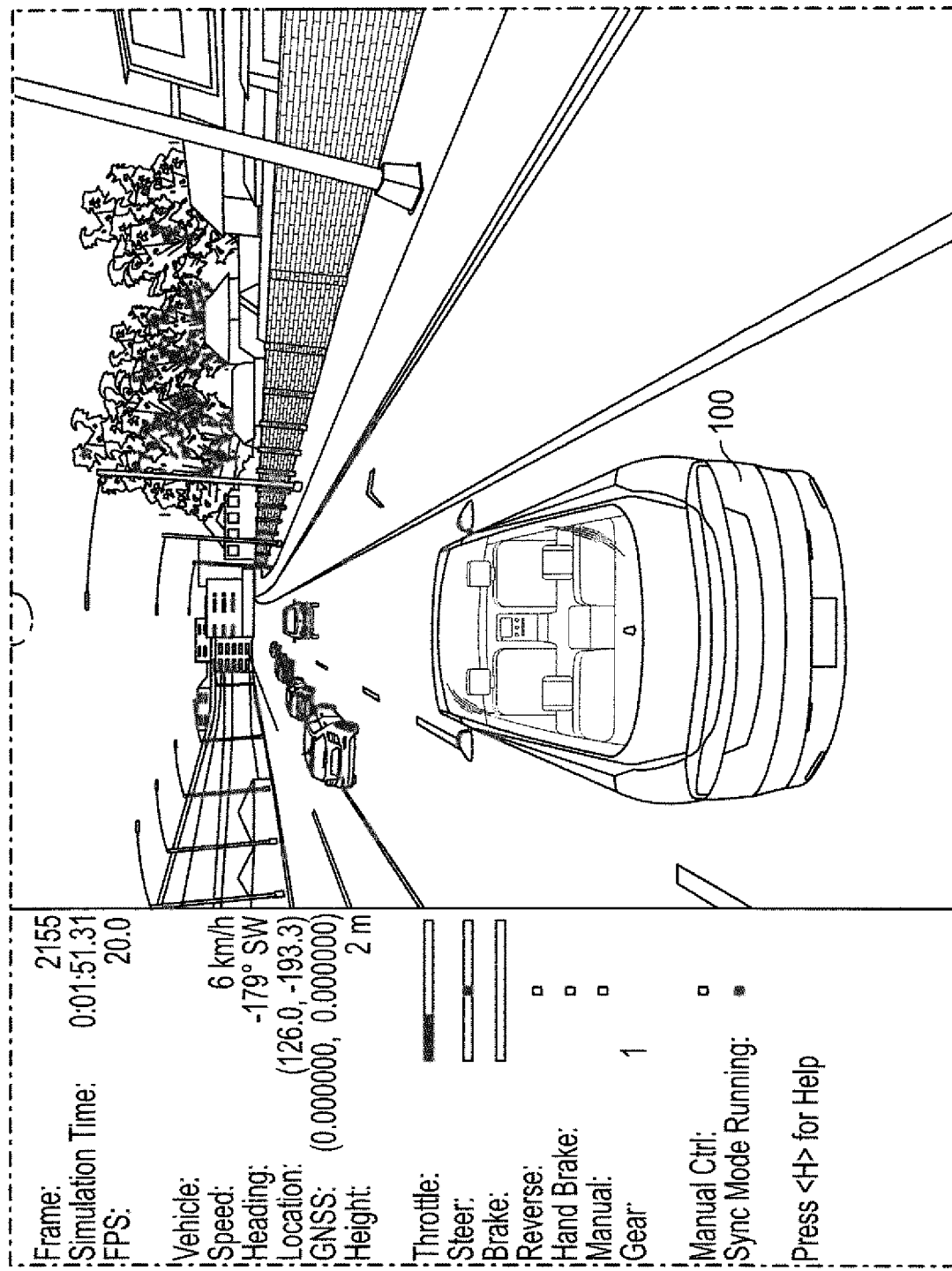

MULTI-PROFILE QUADRATIC PROGRAMMING (MPQP) FOR OPTIMAL GAP SELECTION AND SPEED PLANNING OF AUTONOMOUS DRIVING

RELATED APPLICATIONS

This patent application is related to U.S. Provisional Application No. 63/541,022 filed Sep. 28, 2023, entitled "Multi-Profile Quadratic Programming (MPQP) for Optimal Gap Selection and Speed Planning of Autonomous Driving", in the names of the same inventors which is incorporated herein by reference in its entirety. The present patent application claims the benefit under 35 U.S.C § 119(e) of the aforementioned provisional application.

BACKGROUND

Speed planning may be needed for the deployment of autonomous vehicles. In autonomous driving, trajectory planning may be used to move the autonomous vehicle from point A to point B while trying to avoid any incidents. Trajectory planning may be computed in both discrete and continuous methods.

Formal optimization methods such as model predictive control (MPC) and quadratic programming (QP) have been used for trajectory planning and control tasks for autonomous driving. However, trajectory planning in the presence of dynamic and uncertain factors may result in non-convex issues. These issues may either take time to solve, thereby limiting the optimality or time horizon of the solution or make use of approximations that may get stuck in local optima.

By decoupling the path planning problem from the speed planning problem, one may restrict the optimization space, resulting in faster and more accurate solutions. In autonomous driving applications, space-time (ST) graphs have been used to refine lower and upper bounds which may reduce the search space. The ST graph may also help address dynamic obstacles and their associated ordering problems. While the ST graph simplifies the problem, the synchronization of time and space remains challenging. To address this, some have added synchronized time as a decision variable and solved the non-convex problem with iterative QP approximations. However, the iterative process may be computationally heavy and approximations may not lead to a desired result.

In other cases, users may have employed an ST graph and approximated the non-convex problem as QP but solved it in the space domain to ease the integration of position-based speed limits (e.g., for curved paths). However, planning in the space domain cannot seamlessly consider zero speed as it may cause the time evaluation to be infinity. This may not be desirable in stop-and-go scenarios. In other cases, users may apply Dynamic Programming (DP) to directly optimize non-convex problems on the ST graph. However, DP may suffer from dimensionality, and thus may be limited in number of states and control inputs.

Thus, while existing methods do work, they have yet to address rigorous ways of designing speed planners that simultaneously: (i) search solutions in temporal space, (ii) secure global optimality without approximations, (iii) have high computational efficiency without heuristics, and (iv) address space-time synchronization along with dynamic obstacles.

Limitations and disadvantages of conventional and traditional approaches will become apparent to one of skill in the art, through comparison of described method with some aspects of the present disclosure, as set forth in the remainder of the present application and with reference to the drawings.

SUMMARY

According to an embodiment of the disclosure, a method for generating operable driving areas for an autonomous driving vehicle based on a path trajectory of the autonomous driving vehicle is provided. The method may form a space time (ST) graph indicating a distance of travel along the path trajectory with respect to time of the autonomous driving vehicle and path trajectories of devices intersecting with the path trajectory of the autonomous driving vehicle. The method may also segment the ST graph into cells, wherein viable cells represent discretized viable unoccupied spaces in the ST graph. In addition, the method may find passage ways for the autonomous driving vehicle based on the viable cells. The method may select a desired passage way using quadratic programming (QP) optimization when multiple passage ways are found.

According to another embodiment of the disclosure, a method of controlling an autonomous vehicle, the method implemented using a vehicle control system including a processor communicatively coupled to a memory device is provided. The method may form a space time (ST) graph in Frenet frame indicating a distance of travel along the path trajectory with respect to time of the autonomous vehicle and path trajectories of devices intersecting with the path trajectory of the autonomous vehicle. The method may also segment the ST graph into cells, wherein viable cells represent discretized viable unoccupied spaces in the ST graph. In addition, the method may identify occupied cells associated with each device at each time segment. The method may combine overlapping occupied cells. The method may also form a complimentary set of the occupied cells, the complimentary set of the occupied cells forming the viable cells. The method may find passage ways for the autonomous driving vehicle based on the viable cells using a Breadth-First Search (BFS) process. The method may select a desired passage way using quadratic programming (QP) optimization when multiple passage ways are found.

According to another embodiment of the disclosure, a method for generating operable driving areas for an autonomous driving vehicle based on a path trajectory of the autonomous driving vehicle is provided. The method may form a space time (ST) graph indicating a distance of travel along the path trajectory with respect to time of the autonomous driving vehicle and path trajectories of devices intersecting with the path trajectory of the autonomous driving vehicle. The method may also form a polygon representing each device. In addition, the method may draw the path trajectory for each device. The method may mark where each device intersects with the path trajectory of the autonomous driving vehicle. The method may segment the ST graph into cells, wherein viable cells represent discretized viable unoccupied spaces in the ST graph. The method may also identify occupied cells associated with each device at each time segment. The method may combine overlapping occupied cells. The method may form a complimentary set of the occupied cells, the complimentary set of the occupied cells forming the viable cells. In addition, the method may find passage ways for the autonomous driving vehicle based on the viable cells. The method may progress one time step forward from an initial origin. The method may also expand each passage way by combining overlapping viable cells.

The method may discard each passage way having non-overlapping viable cells. The method may return all expanded passage ways. The method may also select a desired passage way using quadratic programming (QP) optimization when multiple passage ways are found.

BRIEF DESCRIPTION OF THE DRAWINGS

FIG. 2A is a block diagram that illustrates an exemplary autonomous vehicle approaching a T junction, in accordance with an embodiment of the disclosure.

FIG. 2B is an exemplary space-time (ST) graph corresponding to the autonomous vehicle of FIG. 2A, in accordance with an embodiment of the disclosure.

FIG. 2C is an exemplary ST cell planer displaying possible paths for the autonomous vehicle of FIG. 2A found using a Breadth First Search (BFS) algorithm, in accordance with an embodiment of the disclosure.

FIG. 3A displays an exemplary plot depicting soft margins, in accordance with an embodiment of the disclosure.

FIG. 3B displays an exemplary T junction scenario with 2 agents, Car 1966 and Car 1967 for the plots of FIG. 3A, in accordance with an embodiment of the disclosure.

FIG. 4D displays an exemplary lane changing scenario simulation, in accordance with an embodiment of the disclosure.

Figure 1:
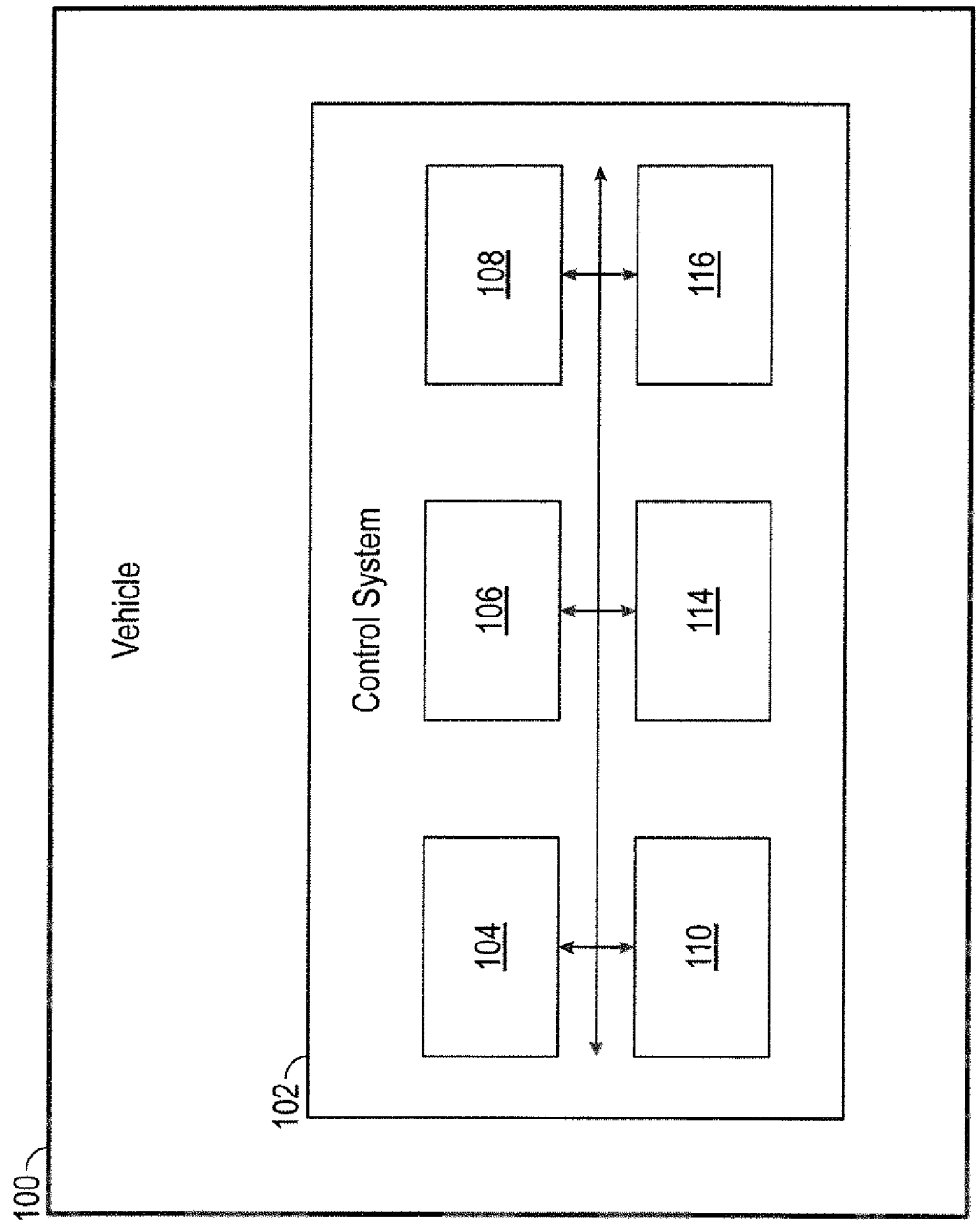
FIG. 1 is a block diagram of an exemplary autonomous vehicle, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The present disclosure provides a mathematical framework that (i) may explore multiple combinations of spatial and temporal scenarios associated with dynamic obstacles and (ii) may optimize the speed profile for the scenarios explored. The formulation may remain in the temporal domain and addresses the space-time synchronization in a convex optimization. The mathematical framework may provide techniques to integrate lateral acceleration limits along with curvatures on a given path thereby accounting for kinematic limits.

The present disclosure provides a method that may examine the inter-traffic gaps in the time and space domain using a breadth-first search. For each gap, quadratic programming (QP) may find a desired speed profile, synchronizing the time and space pair along with dynamic obstacles. The system and method may utilize desired speed planning under the path-speed decomposition scheme. The system and method may utilize the space-time graph to refine the lower and upper bounds, while the refinement is along with the temporal steps. This may allow for a direct and efficient integration of lower and upper bounds into a QP. The QP, as a convex optimization, may yield a globally optimal solution that secures comfort and safety. The system and method may combine hard and soft constraints to produce behaviors that remain desirable while dynamically adapting to complexities of the current scene.

Reference will now be made in detail to specific aspects or features, examples of which are illustrated in the accompanying drawings. Wherever possible, corresponding, or similar reference numbers will be used throughout the drawings to refer to the same or corresponding parts.

Referring to FIG. 1, a functional block diagram of an autonomous vehicle 100 may be shown. The autonomous vehicle 100 may be any vehicle that is capable of carrying one or more occupants. The autonomous vehicle 100 may be powered by an internal combustion engine, one or more electric motors powered by an electric battery, or a combination thereof.

The autonomous vehicle 100 may have a control system 102. The control system 102 may include suitable logic, circuitry, interfaces, and/or code that may be configured to control steering of the autonomous vehicle 100. In accordance with an embodiment, the control system 102 may have at least one processor 104, system memory 106, a telematic/navigation system 108, one or more cameras 110, a plurality of vehicle onboard sensors 112, and a steering mechanism 116.

FIG. 2A is a block diagram that illustrates an exemplary autonomous vehicle 100 approaching a "T" junction. The autonomous vehicle 100 may be any vehicle that contains sensors that perceive the environment around the autonomous vehicle 100 and is being controlled by an autonomous driving system. The path of the autonomous vehicle 100 may be shown by line 102 (hereinafter path 102). Three vehicles identified as veh 1, veh 2, and veh 3 may be in proximity of the "T" junction.

Speed-Time graphs, or ST graphs, may be a plot of speed of a body with respect to time. The speed may be plotted against the Y-axis and time may be plotted on the X-axis. Referring to FIG. 2B, an exemplary space-time (ST) graph corresponding to the autonomous vehicle 100 of FIG. 2A, is shown. FIG. 2B may be explained in conjunction with elements from FIG. 2A. Given the path 102 of the autonomous vehicle 100 and using constant speed predictions, the autonomous vehicle 100 may intersect with vehicles veh 1, veh 2, and veh 3. In accordance with an embodiment, other temporal predictions may be used. The ST graph may be based on the vehicles veh 1, veh 2, and veh 3, being shaped as polygons and a line drawn (time t, distance s) trajectory where the polygon intersects the given path. As may be seen in the ST graph, veh 1 may currently intersect with the path and will drive along the path; veh 2 may be approaching with a lower speed and will merge into the path at a later time; veh 3 may be closest to the ego vehicle 10 and may cross the path at a very low speed.

Referring to FIG. 2C, an exemplary ST Cell Planner corresponding to the ST graph of FIG. 2B, may be shown. FIG. 2C may be explained in conjunction with elements from FIGS. 2A and 2B. The ST Cell Planner may segmentize the continuous ST graph and finds "viable cells" representing discretized feasible spaces. Within the segmentation, Breadth-First Search (BFS) may be utilized to find the possible cases of passage order with respect to the profile of the autonomous vehicle 100.

Figure 2D:
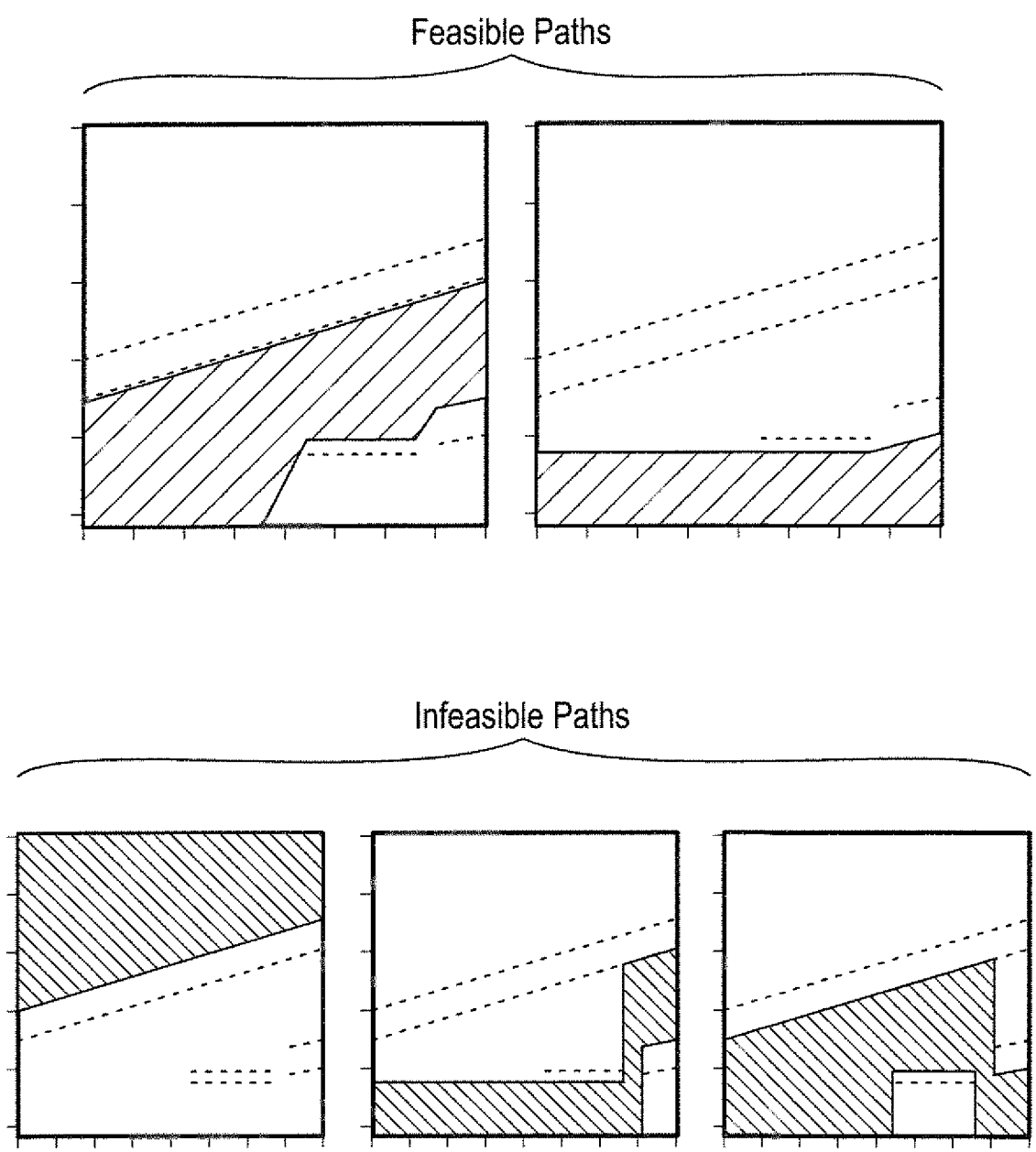
FIG. 2D displays exemplary feasible and non-feasible paths found in the ST graph of FIG. 2B, in accordance with an embodiment of the disclosure.

Referring to FIG. 2D, exemplary feasible and non-feasible paths based on the viable and non-viable cells found by the ST Cell Planner of FIG. 2C may be shown. Given the profile of the autonomous vehicle 100, the associated lower and upper bounds may be generated considering the kinematic limits, i.e. shaded space in the feasible paths.

When multiple profiles exist, the highest profile may be chosen with respect to the minimum cost of quadratic programming (QP). In accordance with an embodiment, the profiles may be independent of each other, thus applicable for parallel computations.

Construction of ST Graph

The construction of the ST graph may be an important step for Multi-Profile Quadratic Programming (MPQP) as it may be the base for determining the feasible space of the quadratic programming in a later step described below. For each vehicle, veh 1, veh 2, and veh 3, a polygon may be computed based on the dimensions of each vehicle and predicted positions. This polygon may be oversized by parameterized margins or uncertainty measures, for example, noise, risk, or prediction noise. If the polygon intersects with the path of the autonomous vehicle 100, the intersecting area, time and distance, may be marked on the ST graph. In the present embodiment, the ST graph may be in Frenet frame. Thus the intersecting area may be converted to Frenet frame. After all, each vehicle may be represented as two line segments in the (time, distance) coordinate. These lines may be shifted to account for safety margins.

Viable Cell Generation

A "viable cell" may represent a feasible set in the ST graph, excluding the space occupied by other agents/vehicles, represented by "occupied cells". At each time segment, a cell is defined by the bounds in distance s, i.e., cell={$s_{min}$, $s_{max}$}. For brevity, the algorithm of the segmentation and cell generation may be labeled as a "Cell Planner". The cell planner may first identify occupied cells associated with each agent/vehicle at each time segment. It is possible that multiple occupied cells exist. If the occupied cells overlap, they may be combined. The viable cells may then be found as a complementary set of the occupied cells. For instance, at the time segment with t=2, suppose there exist three vehicles (i.e., three occupied cells):

$$\text{occupied cells}(t = 2s) = \begin{cases} oc_1 = \{4, 6\} \\ oc_2 = \{5, 8\} \\ oc_3 = \{20, 25\} \end{cases} \quad (1)$$

As $oc_1$ and $oc_2$ are overlapped, they are combined:

$$\text{occupied cells}(t = 2) = \begin{cases} \widetilde{oc}_1 = \{4, 8\} \\ \widetilde{oc}_2 = \{20, 25\} \end{cases} \quad (2)$$

The viable cells are the complementary set of $\widetilde{oc}_{c1}$ and $\widetilde{oc}_2$:

$$\text{viable cells}(t = 2) = \begin{cases} vc_1 = \{0, 4\} \\ vc_2 = \{8, 20\} \\ vc_3 = \{25, \hat{s}\} \end{cases} \quad (3)$$

where the $\hat{s}$ is the upper bound in distance.

Profile Search

Possible profiles in the ST graph that match specified criteria may be identified. In accordance with an embodiment, a Breadth First Search (BFS) algorithm may be used. BFS algorithms are algorithms that search a graph data structure for a node that meets a set of criteria. Thus, the BFS algorithm may be used to discover possible profiles in the ST graph. In accordance with one embodiment, the search process of the BFS algorithm may perform the following:

1) Starting from the origin, progress one step forward in time.

2) Expand a profile for each viable cell if the cell overlaps with any viable cells in the previous step.

3) Otherwise, terminate and discard the profile.

4) If the time step reaches the end (i.e., planning horizon), return all valid profiles.

As may be seen in (2) above, (2) indicates that multiple viable cells may be connected in each time step as may be seen in FIG. 2C. If no viable cell exists at the origin, the ST graph is not traversable, and thus no profile exists.

Integration to QP

Constructing the ST graph may be used to facilitate the underlying speed optimization. First, the ST graph may be segmentize with the equivalent time step (0.1 sec) to that of QP. This may be straightforward while being highly effective in synchronizing the path and the speed. Second, a lower bound may be generated of each profile by connecting the lower end of viable cells at each time step. Similarly, an upper bound may be generated by connecting the upper end of viable cells. Third, one may post-filter all valid profiles with kinematic limits (in speed, acceleration, and jerk). This may help to reduce the number of profiles as well as ensure the (longitudinal) kinematic limits.

Depending on the step size, the overall process might be computationally expensive. However, processing each profile in the above identified Profile Search and Integration to QP sections may be completely separable, thus parallel computations may resolve the issue. A resulting profile is represented by a pair of boundaries with synchronized time. That may be seamlessly integrated into QP.

Optimization

Given the piecewise linear bounds obtained from the ST graph, quadratic programming may be formulated that may optimize speed and avoids issues.

1) System Dynamics: The state includes [distance, speed, acceleration] denoted by [p, v, a], and the control is jerk j. It may be desirous to find the optimal speed profile along with the longitudinal direction, and thus one may leverage the simplified longitudinal dynamics:

$$p(t+1) = p(t) + v(t)dt, \forall t \in [0, \ldots, N-1] \quad (4)$$

$$v(t+1) = v(t) + a(t)dt, \forall t \in [0, \ldots, N-2] \quad (5)$$

$$a(t+1) = a(t) + j(t)dt, \forall t \in [0, \ldots, N-3] \quad (6)$$

With the augmented variable x=[p, v, a, j], one may write the dynamics in the compact form:

$$x(t+1) = f(x(t)) \quad (7)$$

where f(•) is the linear mapping with Eqn. (4)-(6).

Objective Function

The objective may be to enhance passenger comfort and reduce travel time. Formally, the objective function F reads:

$$F = \frac{1}{2}x^T H x + x^T h. \quad (8)$$

where $H \in R^{dim(x) \times dim(x)}$ is a diagonal matrix where the weight $w_a$ may be imposed on accelerations (for all $t \in [0, \ldots, N-2]$) and the weight $w_j$ may be imposed on jerks (for all $t \in [0, \ldots, N-3]$) while it is zero everywhere else. The vector h may have zero value for all elements except for the final displacement at t=N (i.e., p(N)), which may be set to $-w_f (w_f > 0)$ to encourage a large displacement with respect to the initial position (i.e., a shorter travel time).

Constraints

There may be two types of constraints: (i) initial conditions and (ii) lower and upper bounds. The initial conditions may read:

$$p(0) = p_0, \quad (9)$$

$$v(0) = v_0, \quad (10)$$

where $p_0$ and $v_0$ may denote the displacement and speed measured at the current time, respectively. In compact form, one may rewrite it with the augmented variable x, i.e., $x(0)=x_0$.

Recall that the lower and upper bounds are obtained from the ST graph in the Construction of Space-Time Graph section above and thus they are given and known. The corresponding inequality constraints may read:

$$lb(t) \leq x(t) \leq ub(t) \; \forall t \in [0, \ldots, N]. \quad (11)$$

Note that the lower and upper bounds may be engineered with customized margin choices (such as parameters), which may potentially cause infeasibility issues. Details are discussed below.

Complete Problem

The complete optimization problem may read:

$$\min_x \frac{1}{2}x^T H x + x^T h \quad (12a)$$

subject to:

$$x(t+1) = f(x(t)), \forall t \in [0, \ldots, N-1] \quad (12b)$$

$$lb(t) \leq x(t), \leq ub(t) \; \forall t \in [0, \ldots, N] \quad (12c)$$

$$x(0) = x_0. \quad (12d)$$

Note that this is a generic form of QP without any (iterative) approximations—it retains nice convex optimization properties, e.g., optimality and convergence rate.

Soft-Constraints for Relaxed Problem

The inequality constraints as shown in the equation (11) may be violated depending on the constructed ST graph, leading to a problem that may not be feasible to solve. Examples may include: (i) two predicted agent trajectories overlapping, causing no-existing feasible throughput within the planning horizon, and (ii) the initial position of the autonomous vehicle 100 being outside the feasible space defined by the two bounds (due to excessive margin parameters and/or perception/localization noises). Infeasible solutions may cause jerky and uncomfortable maneuvering (depending on the pre-defined actions for infeasible solutions).

One solution may be to reformulate the problem by relaxing the constraints, leaving the problem soft constrained. One may add a slack variable for each bound (i.e., $s_{lb}$ and $s_{ub}$) and penalize non-zero slack variables in the objective function. The problem may now read:

$$\min_{x, s_{lb}, s_{ub}} \frac{1}{2}x^T H x + x^T h + w_b^T (s_{lb} + s_{ub}) \quad (13a)$$

subject to:

$$x(t+1) = f(x(t)), \forall t \in [0, \ldots, N-1] \quad (13b)$$

$$lb(t) - s_{lb}(t) \leq x(t) \leq ub(t) + s_{ub}(t), \forall t \in [0, \ldots, N] \quad (13c)$$

$$x(0) = x_0, \quad (13d)$$

$$0 \leq s_{lb}(t) \leq s_{max \; lb}(t) \quad (13e)$$

$$0 \leq s_{ub}(t) \leq s_{max \; ub}(t) \quad (13f)$$

where $w_b$ denotes the penalty weight on the boundary slack variables. Note that the slack variables may be temporal for all t and only non-zero values may be penalized. Also, note that the slack variables may be bounded (by $s_{max \; lb}$ and $s_{max \; ub}$) to ensure safety. FIG. 3A may illustrate the soft margins for a simple T-Junction scenario shown in FIG. 3B.

Funnel Technique to Impose Lateral Acceleration Limits

One caveat of longitudinal speed planning is that it may disregard lateral accelerations and associated kinematic limits associated with the given path. However, directly evaluating the lateral accelerations leads the problem to non-convex, which may result in a higher complexity problem to solve. An easily implementable yet effective method to this may be the funnel technique.

Given the path, one may compute the curvature K at each position step s. With a parametric lateral acceleration limit $a_\ell$, the associated speed limit is:

$$v_s = \sqrt{\frac{a_\ell}{K_s}}. \quad (14)$$

With a parametric distance lookahead L, the speed limit $v_l$ may be set to the minimum of $v_s$, i.e., $v_l = \min(v_s, v_{max})$, $\forall s \in \{0, \ldots, L\}$, where $v_{max}$ may be the traffic speed limit. Yet, the speed limit $v_l$ cannot be immediately used to upper bound the speed in QP in Eqn. (13) since the QP may become infeasible if the current speed is higher than $v_l$. Instead, the upper bound may be funneled down from the traffic speed limit to $v_l$ by linearly decreasing with a fixed rate. Note that a high decreasing rate might overly tighten the upper bounds, which in turn may restrict the feasible set. In accordance with an embodiment, half the minimum acceleration, i.e., $-a_{min}/2$, may be used as a comfortable rate.

Validations

A. Simulation Overview

To validate the above, CARLA may be used for a high-fidelity simulation environment. CARLA is an open-source autonomous driving simulator which generally has been adopted for validating autonomous driving research. Scenarios may be generated using the "scenario runner", the CARLA built-in simulation generation platform.

In accordance with an embodiment, CARLA was used to test MPQP with four different scenarios: (i) highway merging, (ii) T-junction, (iii) four-way intersection, and (iv) lane changing in dense traffic, as presented in FIG. 4A-4D. Each scenario may have different road structures, target lanes, and traffic participants.

Figure 4A:
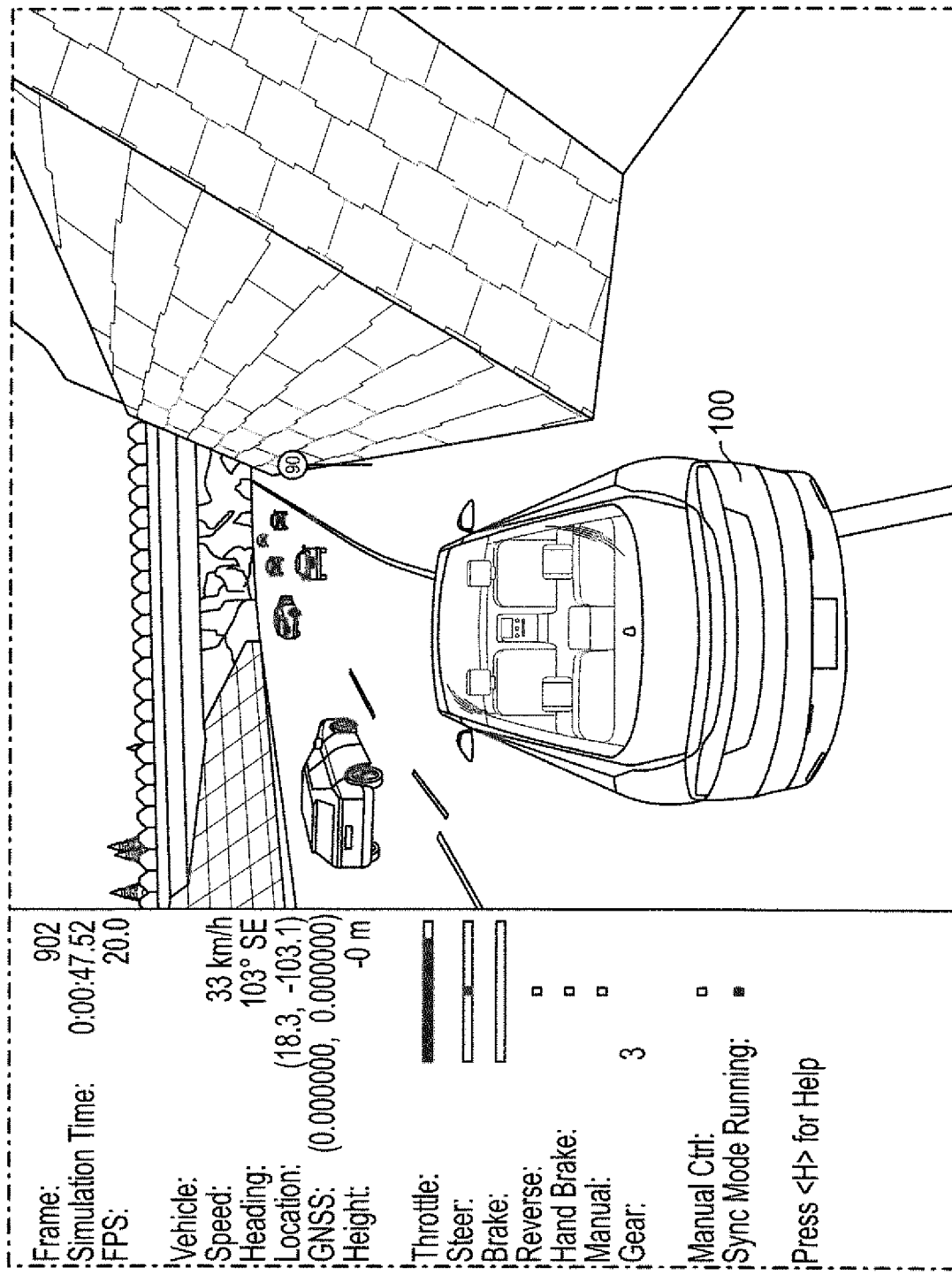
FIG. 4A displays an exemplary highway merging scenario simulation, in accordance with an embodiment of the disclosure.

Highway merging scenario, FIG. 4A: The autonomous vehicle 100 may start on the ramp and merge into the lane. Other vehicles in the target lane may drive fast with randomness in their yielding behaviors toward the autonomous vehicle 100.

Figure 4B:
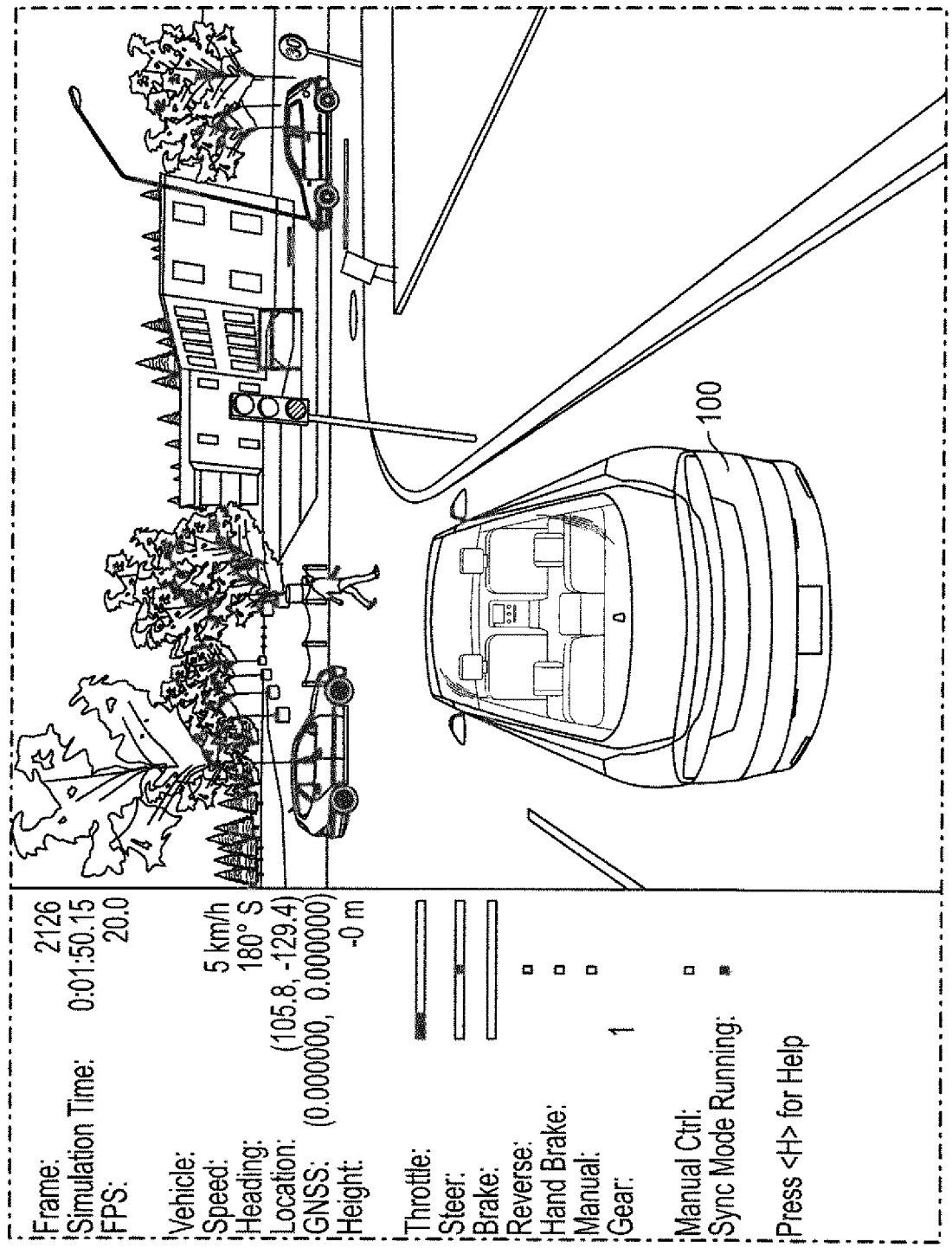
FIG. 4B displays an exemplary T-junction scenario simulation, in accordance with an embodiment of the disclosure.

T-junction scenario, FIG. 4B: The autonomous vehicle 100 may make an unprotected left turn while maintaining safety for crossing pedestrians.

Figure 4C:
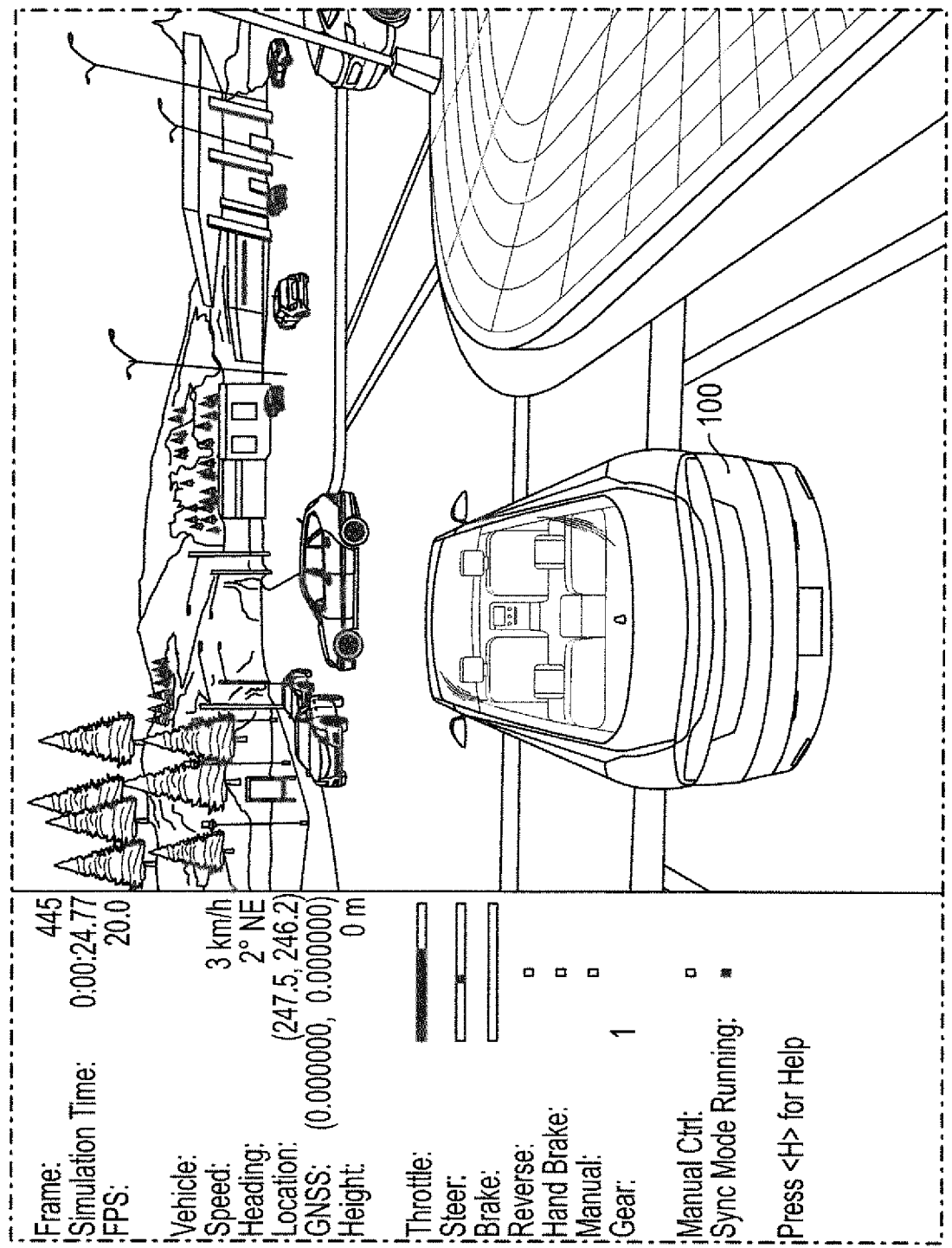
FIG. 4C displays an exemplary four-way intersection scenario simulation, in accordance with an embodiment of the disclosure.

Four-way intersection scenario, FIG. 4C: The autonomous vehicle 100 may make a left turn. The increased complexity may be due to additional vehicles approaching from the opposite direction.

Lane changing scenario, FIG. 4D: The goal may be to lane change into dense traffic to avoid an emergency vehicle stopped in front. There may exist no safe space for the autonomous vehicle 100 to merge without interacting with other cars (i.e., without the cooperation of other vehicles).

This set of scenarios and their inherent challenges may be used to evaluate the general performance of the above disclosed algorithm. Note that the same algorithm may be used for all scenarios, while positions and driving behaviors (e.g., target speed) of other vehicles are randomly initialized in each run. Other vehicles may be modeled as intelligent driver model (IDM) with some modifications to detect the ego vehicle 10 in the adjacent lane. The yielding behavior may be triggered according to a pre-set Bernoulli parameter. Overall, the vehicles may be designed to be aggressive in order to challenge the above algorithm. The behavior model for the agents may be lane following (except for pedestrians that may randomly change directions) and traffic does not change lanes.

MPQP's processing time may average 20 ms with a maximum time cycle of 84 ms on a laptop with an Intel® Core™ i9-12900H and 32 GB RAM. This processing time may include all the aforementioned steps: ST graph construction (using ClipperLib), ST Cell Planning, and quadratic programming (using qpOASES). While the planned trajectory may be sent to an underlying controller, MPQP finds a new solution. In accordance with an embodiment, the planning horizon may be set to 10 seconds for slow speed scenarios and 15 seconds for high-speed scenarios. This may indicate a strong potential for MPQP to be applicable to real-time systems even with a relatively long planning horizon.

B. Simulation Result

Figures 5A, 5B:
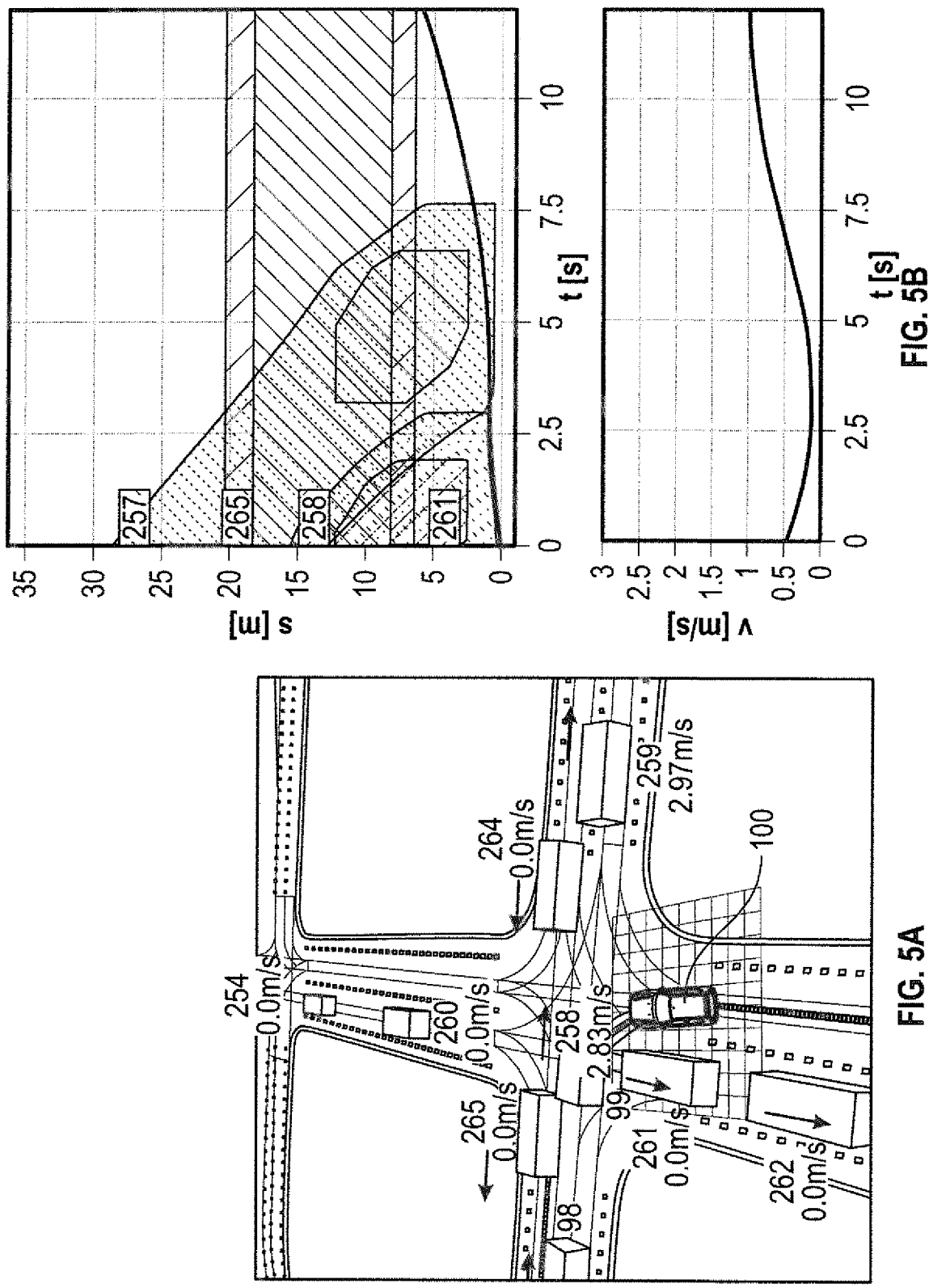
FIG. 5A displays an exemplary plot depicting soft margins, in accordance with an embodiment of the disclosure.
FIG. 5B displays an exemplary four-way intersection scenario simulation, in accordance with an embodiment of the disclosure.
Figure 6:
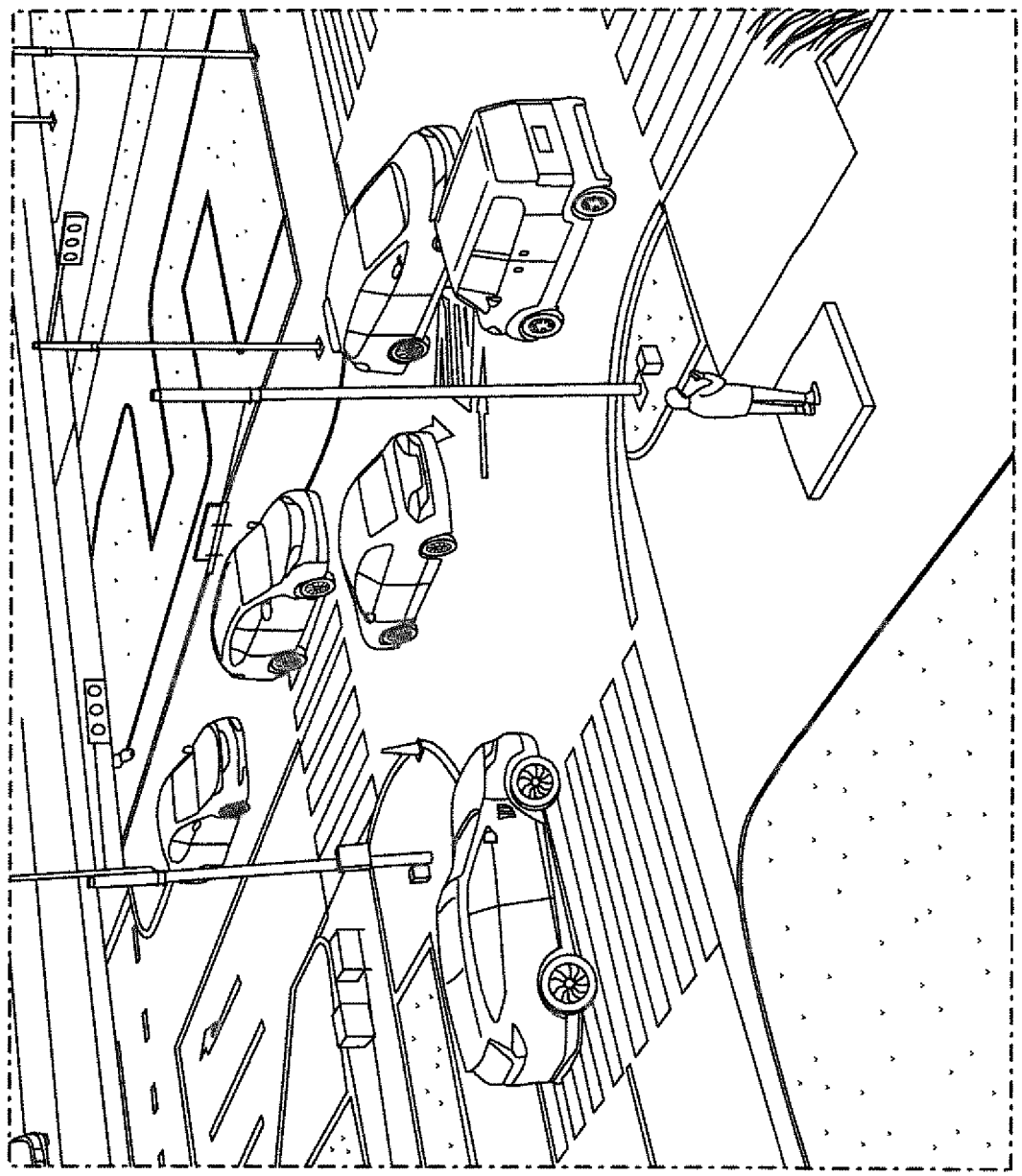
FIG. 6 illustrates an exemplary four-way intersection scenario simulation, in accordance with an embodiment of the disclosure.

In accordance with an embodiment, the performance of MPQP in a four-way intersection scenario shown in FIG. 5A may be examined. The autonomous vehicle 100 may takes a left turn to interact with unexpected pedestrian crossing. The general behaviors of MPQP may be observed as: (i) the autonomous vehicle 100 approaches the intersection; (ii) the autonomous vehicle 100 stays stopped until the oncoming vehicles cross—FIG. 5A may illustrate the autonomous vehicle 100 slowly cruising until the oncoming cars (labeled as 258 and 257) pass on lane 98; (iii) if the car (car 264 in FIG. 5A) on the merging lane does not slow down, the autonomous vehicle 100 may slow down and waits. Otherwise, the autonomous vehicle 100 may proceed; (iv) while completing the turn, a pedestrian suddenly crosses the road and MPQP waits. Depending on the initial positions and aggressiveness of the traffic, the behaviors might vary, however, MPQP consistently secured safe and successful merging.

Now, the analysis may be extended across the aforementioned four scenarios: highway merging, T-junction, four-way intersection, and lane change. Table I below tabulates the overall performance for each scenario that was repeated 50 times with random initialization. Overall, MPQP successfully completes the scenarios without collisions or timeout. Note that MPQP does not have prior knowledge of what scenario will be running and of what behavior model the traffic is based upon. That is, MPQP demonstrates a capability of generalizability without situational knowledge and with the presence of uncertainties. Based on the tabulations of Table I, one may observe: (i) The T-junction scenario may have a higher average on the brake than that in the highway (which has a higher speed throughput). This may be explained by the uncertain behavioral changes of traffic in the T-junction scenario. Due to the unexpected acceleration of the vehicle at the merging point, the autonomous vehicle 100 may have to slow down strongly to keep prevent any incidents. The same behavior may be observed in the four-way scenario, however, the average speed may be much lower due to the density which results in less aggressive brake and jerk. (ii) The autonomous vehicle 100 tends to drive smoother and slower for lane changing in dense traffic, waiting for their cooperation (i.e., making room for the autonomous vehicle 100). (iii) The autonomous vehicle 100 tends to be more conservative in the T-junction and fourway scenarios as there exists priority between traffic agents. The priority may be given to the pedestrians and oncoming cars (especially in the T-junction scenario). Accordingly, the autonomous vehicle 100 may tend to be defensive and merges to the target lane only if the car obviously gives way to the autonomous vehicle 100 or if safety is guaranteed (e.g., no vehicle). The overall behaviors are aligned with an experienced human driver who balances between being defensive and not being too conservative.

reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not to be limited to the particular embodiment disclosed, but that the present disclosure will include all embodiments that fall within the scope of the appended claims.

TABLE I

| Scenario | Time | Succ. (%) | Coll. (%) | Time out (%) | Brake Avg | Thr. Avg | Acc. Max | Brake Jerk Avg | Thr. Jerk Avg | Ang. Acc. Avg | Ang. Acc. Max | Ang. Jerk Avg | Ang. Jerk Max |
|---|---|---|---|---|---|---|---|---|---|---|---|---|---|
| Highway merging | 20.17 | 100 | 0 | 0 | −0.64 | 0.75 | 1.87 | −0.73 | 0.9 | 1.36 | 8.22 | 2.31 | 15.43 |
| T-junction | 22.18 | 100 | 0 | 0 | −0.71 | 0.66 | 1.97 | −0.86 | 0.85 | 2.44 | 12.26 | 3.46 | 23.45 |
| Four-way intersection | 31.34 | 100 | 0 | 0 | −0.32 | 0.42 | 1.96 | −0.47 | 0.45 | 0.97 | 10.59 | 4.24 | 47.36 |
| Lane change in dense traffic | 41.77 | 100 | 0 | 0 | −0.19 | 0.25 | 1.4 | −0.34 | 0.32 | 1.5 | 18.84 | 2.17 | 30.29 |

Using path-speed decomposition methods, this present disclosure provides a mathematical framework to optimally plan a speed profile for automated vehicles, namely MPQP. Given a path, the present method leverages the Breadth First Search algorithm to find timing combinations to follow the path when dynamic objects are present. Each profile is then integrated into Quadratic Programming as lower and upper bounds. The formulation and implementation are computationally efficient, being capable of providing a new solution within 20 ms on average for 10+ seconds of planning horizon. Simulation results in CARLA demonstrate the strong potential of MPQP, followed by a real-car demonstration with public participants.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b)

The invention claimed is:

1. A method for generating operable driving areas for an autonomous driving vehicle based on a path trajectory of the autonomous driving vehicle, comprising:
   forming a space time (ST) graph indicating a distance of travel along the path trajectory with respect to time of the autonomous driving vehicle and path trajectories of devices intersecting with the path trajectory of the autonomous driving vehicle;
   segmenting the ST graph into cells, wherein viable cells represent discretized viable unoccupied spaces in the ST graph, wherein segmenting the ST graph comprises:
      identifying occupied cells associated with each device at each time segment;
      combining overlapping occupied cells; and
      forming a complimentary set of the occupied cells, the complimentary set of the occupied cells forming the viable cells:
   finding passage ways for the autonomous driving vehicle based on the viable cells; and
   selecting a desired passage way using quadratic programming (QP) optimization when multiple passage ways are found.

2. The method of claim 1, comprising using a Breadth-First Search (BFS) process to find the passage ways.

3. The method of claim 1, wherein forming the ST graph comprises forming the ST graph in Frenet frame.

4. The method of claim 1, wherein forming the ST graph comprises forming the ST graph in Frenet frame, wherein each area where the path trajectory of each device intersects with the path trajectory of the autonomous driving vehicle is converted to Frenet frame.

5. The method of claim 1, wherein forming the ST graph comprises:
   forming a polygon representing each device;
   drawing the path trajectory for each device; and
   marking where each device intersects with the path trajectory of the autonomous driving vehicle.

6. The method of claim 5, wherein the path trajectory of each device is based on a temporal prediction for each device.

7. The method of claim 5, wherein each polygon is dimensioned based on a size of each device.

8. The method of claim 5, wherein each polygon is dimensioned based on a size of each device, each polygon being oversized by at least one of parameterized margins, noise, risk factor, and prediction noise.

9. The method of claim 1, wherein each cell is defined at each time segment on the ST graph by minimum $s_{min}$ and maximum $s_{max}$ bounds in distance.

10. The method of claim 1, wherein finding passage ways comprises, using a profile search to find the passage ways, wherein the profile search comprises:
progressing one time step forward from an initial origin;
expanding profiles for each viable cell that overlaps with any viable cell from the initial origin forming the passage ways;
discarding all profiles having non-overlapping viable cells; and
returning all the passage ways formed once the one time step reaches an end value.

11. The method of claim 1, comprising integrating the ST graph with QP the integration comprising:
segmenting the ST graph with an equivalent time step to the QP; and
generating an upper bound and a lower bound for each passage way.

12. The method of claim 10, comprising filtering all passage ways with kinematic limits.

13. A method of controlling an autonomous vehicle, the method implemented using a vehicle control system including a processor communicatively coupled to a memory device, the method comprising:
forming a space time (ST) graph in Frenet frame indicating a distance of travel along the path trajectory with respect to time of the autonomous vehicle and path trajectories of devices intersecting with the path trajectory of the autonomous vehicle;
segmenting the ST graph into cells, wherein viable cells represent discretized viable unoccupied spaces in the ST graph, wherein segmenting the ST graph comprises:
identifying occupied cells associated with each device at each time segment;
combining overlapping occupied cells; and
forming a complimentary set of the occupied cells, the complimentary set of the occupied cells forming the viable cells;
finding passage ways for the autonomous driving vehicle based on the viable cells using a Breadth-First Search (BFS) process; and
selecting a desired passage way using quadratic programming (QP) optimization when multiple passage ways are found.

14. The method of claim 12, wherein forming the ST graph comprises:
forming a polygon representing each device;
drawing the path trajectory for each device; and
marking where each device Intersects with the path trajectory of the autonomous vehicle.

15. The method of claim 13, wherein each polygon is dimensioned based on a size of each device, each polygon being oversized by at least one of parameterized margins, noise, risk factor, and prediction noise.

16. The method of claim 11, wherein finding passage ways comprises, using a profile search to find the passage ways, wherein the profile search comprises;
progressing one time step forward from an initial origin;
expanding profiles for each viable cell overlapping with any viable cell from the Initial origin forming the passage ways;
discarding all profiles having non-overlapping viable cells; and
returning all passage ways formed once the one time step reaches an end value.

17. The method of claim 11, comprising integrating the ST graph with QP the integration comprising:
segmenting the ST graph with an equivalent time step to the QP;
generating an upper bound and a lower bound for each passage way; and
filtering all passage ways with kinematic limits.

18. A method for generating operable driving areas for an autonomous driving vehicle based on a path trajectory of the autonomous driving vehicle, comprising:
forming a space time (ST) graph indicating a distance of travel along the path trajectory with respect to time of the autonomous driving vehicle and path trajectories of devices intersecting with the path trajectory of the autonomous driving vehicle, wherein forming the ST graph comprises:
forming a polygon representing each device;
drawing the path trajectory for each device; and
marking where each device intersects with the path trajectory of the autonomous driving vehicle;
segmenting the ST graph into cells, wherein viable cells represent discretized viable unoccupied spaces in the ST graph, wherein segmenting the ST graph comprises:
identifying occupied cells associated with each device at each time segment;
combining overlapping occupied cells; and
forming a complimentary set of the occupied cells, the complimentary set of the occupied cells forming the viable cells;
finding passage ways for the autonomous driving vehicle based on the viable cells using a profile search to find the passage ways, wherein the profile search comprises:
progressing one time step forward from an initial origin;
expanding profiles for each viable cell that overlaps with any viable cell from the initial origin forming the passage ways;
discarding all profiles having non-overlapping viable cells; and
returning all the passage ways formed once the one time step reaches an end value; and
selecting a desired passage way using quadratic programming (QP) optimization when multiple passage ways are found.

19. The method of claim 17, comprising integrating the ST graph with QP, the integration comprising:
segmenting the ST graph with an equivalent time step to the QP;
generating an upper bound and a lower bound for each passage way; and
filtering all passage ways with kinematic limits.

* * * * *